(12) United States Patent
Grohn et al.

(10) Patent No.: US 6,405,337 B1
(45) Date of Patent: Jun. 11, 2002

(54) SYSTEMS, METHODS AND COMPUTER PROGRAM PRODUCTS FOR ADJUSTING A TIMEOUT FOR MESSAGE RETRANSMISSION BASED ON MEASURED ROUND-TRIP COMMUNICATIONS DELAYS

(75) Inventors: Ossi I. Grohn, Apex; Jeffrey D. Seifert, Durham, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/337,182

(22) Filed: Jun. 21, 1999

(51) Int. Cl.[7] .................................................. H04L 1/18
(52) U.S. Cl. ....................................... 714/749; 714/750
(58) Field of Search .............. 370/60, 231; 395/182.16; 342/125; 380/21; 714/749, 750, 820, 822, 712; 709/237, 234

(56) References Cited

U.S. PATENT DOCUMENTS

| | | | |
|---|---|---|---|
| 4,617,657 A | | 10/1986 | Drynan et al. ................ 370/60 |
| 4,908,627 A | * | 3/1990 | Santos ......................... 342/125 |
| 4,926,478 A | * | 5/1990 | Gruenberg ................... 380/21 |
| 5,664,091 A | | 9/1997 | Keen ...................... 395/182.16 |
| 5,719,882 A | * | 2/1998 | Ellis ........................... 714/749 |
| 5,951,648 A | * | 9/1999 | Kailash ....................... 709/237 |
| 6,247,058 B1 | * | 6/2001 | Miller et al. ................ 709/234 |
| 6,298,041 B1 | * | 10/2001 | Packer ........................ 370/231 |

FOREIGN PATENT DOCUMENTS

WO     WO 96/30841     10/1996

OTHER PUBLICATIONS

International Search Report, PCT/US00/14265, Sep. 27, 2000.

* cited by examiner

*Primary Examiner*—David Ton
(74) *Attorney, Agent, or Firm*—Myers Bigel Sibley & Sajovec

(57) ABSTRACT

A round-trip communications delay between two devices that communicate with one another over a communications network is repeatedly measured. An adjustable retransmission timeout is adjusted based upon at least one of the round-trip communications delays that are repeatedly measured. A message that is not acknowledged during the adjustable retransmission timeout is retransmitted. Accordingly, the overall communications speed between the two devices may be increased by accounting for the actual delay that is present in a network at a current time, and basing an adjustable retransmission timeout on this actual delay.

12 Claims, 4 Drawing Sheets

SYSTEMS, METHODS AND COMPUTER PROGRAM PRODUCTS FOR ADJUSTING A TIMEOUT FOR MESSAGE RETRANSMISSION BASED ON MEASURED ROUND-TRIP COMMUNICATIONS DELAYS

FIELD OF THE INVENTION

This invention relates to communications systems, methods and computer program products, and more particularly to systems, methods and computer program products for communicating between two devices that are connected by a communications network.

BACKGROUND OF THE INVENTION

Communications networks are widely used to communicate among devices that are attached thereto. As is well known to those having skill in the art, the devices may include mainframe computers, midrange computers, personal computers, workstations, terminals and/or telecommunications devices, such as cellular radiotelephones, satellite radiotelephones, personal digital assistants and/or other wireless communications devices. The network may include a Local Area Network, a Wide Area Network, the Internet, an intranet, a cellular/satellite radiotelephone communications network and/or other wired or wireless communications networks. Communications may take place in a peer-to-peer, client-server or other environments. FIG. 1 is a simplified block diagram of conventional network communications between Device 1 100 and Device 2 120 over a communications network 110.

When two devices 100 and 120 communicate between one another over a communications network 110, the messages between the devices may be lost due to errors in the network and/or other reasons. When messages are lost, they generally are retransmitted. In order to determine whether a message has been lost, a receiving device generally transmits an acknowledgement message to a transmitting device for each received message. If the transmitting device does not receive the acknowledgement message after a fixed time elapses, it can retransmit the original message.

The fixed time, also referred to as a retransmission timeout, generally is set to be long enough to account for all possible delays that may be present in the network. By accounting for all possible delays, the number of messages that are needlessly retransmitted can be reduced and preferably can be eliminated. Unfortunately, when an error occurs in the network and a message sent by a first device is not received by a second device, the long retransmission timeout may produce long communications delays between the two devices. These delays can degrade communications between the devices.

SUMMARY OF THE INVENTION

It is therefore an object of the present invention to provide improved systems, methods and computer program products for communicating between two devices that are connected by a communications network.

It is another object of the present invention to provide systems, methods and computer program products for communicating between two devices that are connected by a communications network, which can reduce the retransmission timeout that controls retransmission of a message that is not received.

These and other objects are provided according to the present invention by systems, methods and computer program products for communicating between two devices that are connected by a communications network, by repeatedly measuring a round-trip communications delay between the two devices over the communications network, and adjusting an adjustable retransmission timeout based upon at least one of the round-trip communications delays that are repeatedly measured. A message that is not acknowledged during the adjustable retransmission timeout is retransmitted. The adjustable retransmission timeout preferably is based upon the last measured round-trip communications delay. Accordingly, the overall communications speed between the two devices may be increased by accounting for the actual delay that is present in the network at a given time, and basing an adjustable retransmission timeout on this actual delay. Improved systems, methods and computer program products for communicating between two devices that are connected by a communications network thereby can be provided.

In particular, according to the present invention, a first message is transmitted (sent) at a first (transmit) time and an acknowledgement of the first message is received at a second (receive) time. A time difference between the second time and the first time is then determined, to thereby obtain the adjustable retransmission timeout. Transmission, reception and determination of a time difference are repeatedly performed, preferably on a periodic basis, to thereby measure the actual round-trip delay in the network, and thereby obtain a suitable value for the timeout.

The first message may be a unique delay measurement message that is used to measure delay and that does not contain communications data. The delay measurement message may contain a timestamp therein that indicates the first time. Alternatively, the transmitting device may maintain a record of the time that the first message was transmitted. The delay measurement message also preferably contains padding therein, so that the delay measurement is at least as long as a longest communication message between the two devices. Thus, although the round-trip communications delay is adjusted based on the actual performance of the network, the performance can represent the actual worst case performance for a longest message.

The acknowledgement message may be an echo back of the first message. Alternatively, the acknowledgement message may be a unique acknowledgement message.

In yet another alternative, the first message is not a unique delay measurement message. Rather, the first message may be a preexisting communications message that is sent from the first device to the second device. The communications message may include a timestamp, or the time that the first message was sent may be recorded in the first device.

The adjustable time may correspond identically to the last measured round-trip delay. Alternatively, the adjustable time may be based on an average of a predetermined number of last round-trip delay measurements. In yet another alternative, a guard band may be added to the last measured round-trip delay to account for potential changes since the last measured delay time. Other techniques for determining the adjustable time may be provided.

Accordingly, the overall communications speed between the devices may be increased since the retransmission may be performed as soon as possible. A higher number of errors also may be able to be tolerated by the communications network, since the number of retransmissions during a given period of time may be increased. By automatically adapting to changed communication network delays, improved systems, methods and computer program products for communicating between two devices that are connected by a communications network may be provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Various aspects of the present invention are illustrated in detail in FIGS. 2–6, including flowchart illustrations. It will be understood that individual blocks of the figures, and combinations of blocks in the figures, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instruction means which implement the functions specified in the block or blocks.

Accordingly, blocks of the figures support combinations of means for performing the specified functions, combinations of steps for performing the specified functions and program instruction means for performing the specified functions. It will also be understood that individual blocks of the figures, and combinations of blocks in the figures, can be implemented by special purpose hardware-based computer systems which perform the specified functions or steps, or by combinations of special purpose hardware and computer instructions.

Figure 1:
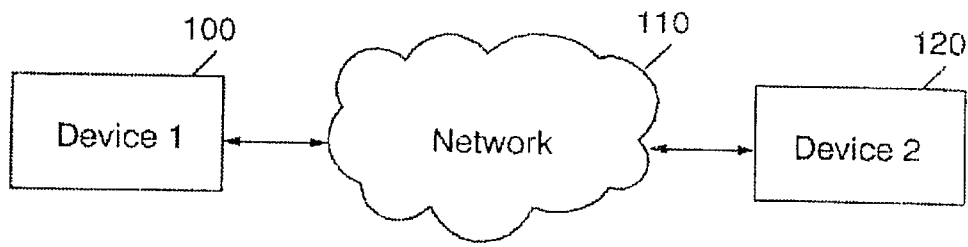
FIG. 1 is a block diagram of conventional communications between devices over a network.
Figure 2:
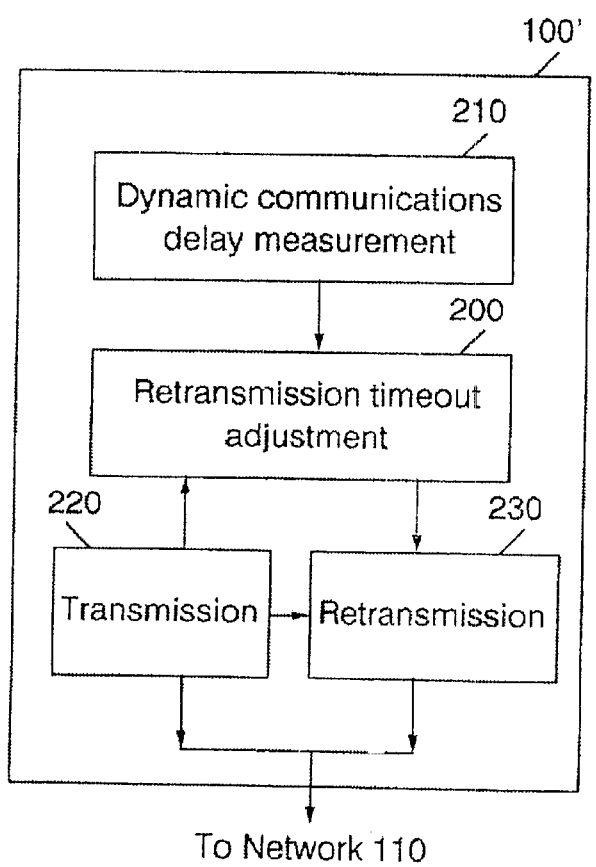
FIG. 2 is a block diagram of a device according to an embodiment of the present invention.

Referring now to FIG. 2, a block diagram of a device 100' according to an embodiment of the present invention will now be described. The device 100' may communicate with a second device 120 over a network 110 in a manner that was illustrated in FIG. 1. As shown in FIG. 2, the device 100' includes dynamic communications delay measurement section 210 that repeatedly measures a round-trip communications delay between the two devices over the communications network. A transmission section 220 transmits a message from the device 100' to the second device 120 over the network 110. A retransmission section 230 retransmits a message that is not acknowledged during an adjustable retransmission timeout after the initial transmission by the transmission section 220. The adjustable retransmission timeout is determined by a retransmission timeout adjustment section 200, based upon at least one of the repeated round-trip communications delays that are repeatedly measured by the dynamic communications delay measurement section 210.

Figure 3:
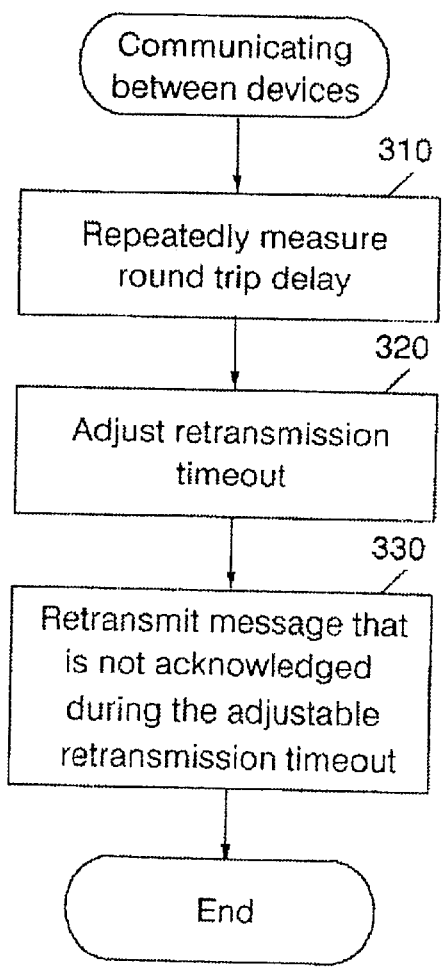
FIG. 3 is a flowchart illustrating communications between devices according to an embodiment of the present invention.
Figure 4:
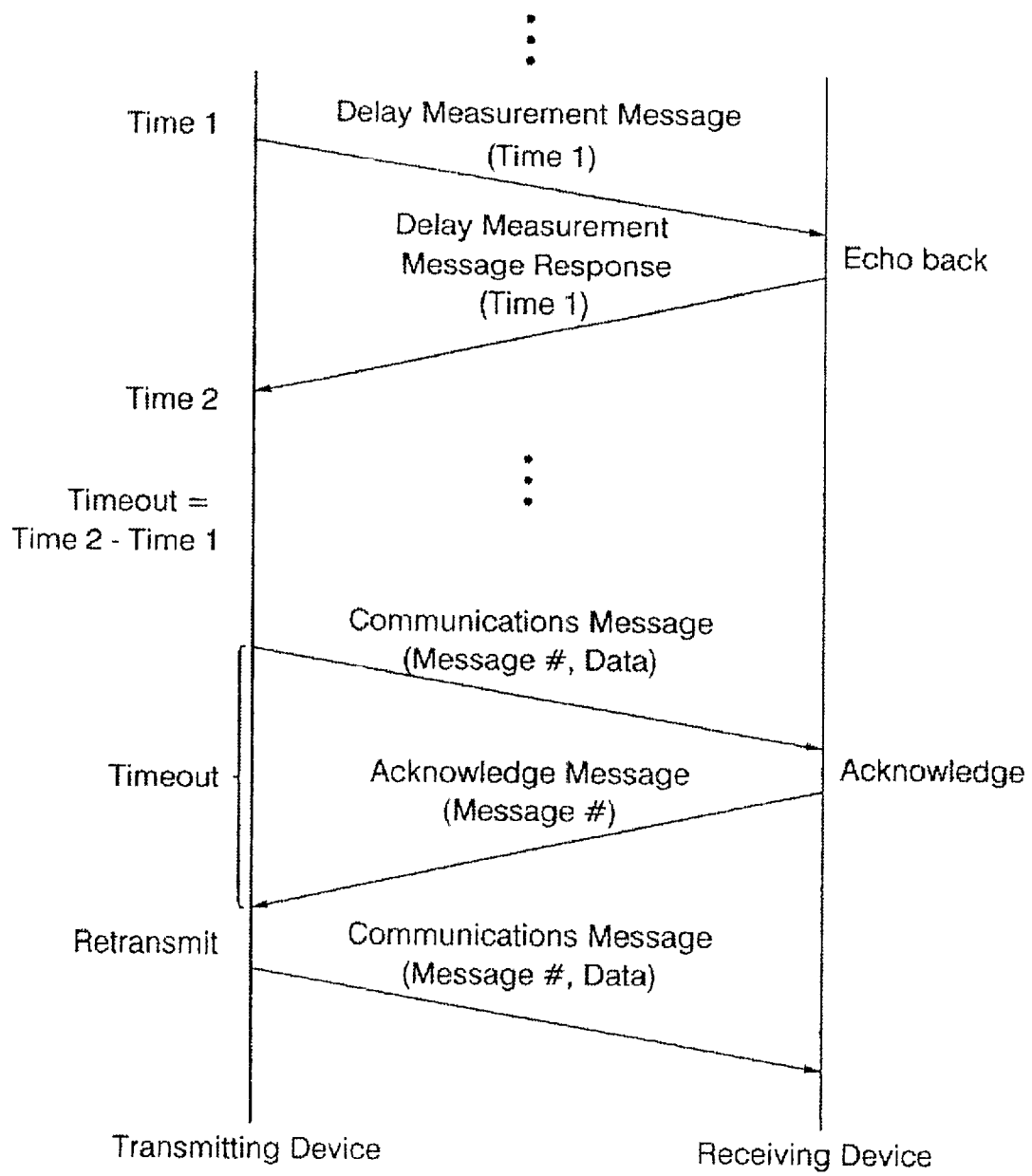
FIG. 4 is a timing diagram illustrating communications between devices according to an embodiment of the present invention.

FIG. 3 illustrates an overview of communicating between devices according to the present invention. As shown at Block 310, round-trip communications delays between the two devices over the communications network are repeatedly measured. For example, as shown in FIG. 4, at Time 1, a first message in the form of a unique Delay Measurement Message is transmitted from the transmitting device to the receiving device. The Delay Measurement Message includes a timestamp (Time 1) therein. The receipt of the Delay Measurement Message is acknowledged by the receiving device echoing back the Delay Measurement Message. The echoed back Delay Measurement Message arrives at the transmitting device at a second time Time 2. A time difference between the second time and the first time is then determined in order to determine a retransmission timeout.

It will be understood by those having skill in the art that a unique measurement message need not be transmitted in order to measure the round-trip communications delay. Rather, a conventional data communications message may be sent and the response to the data communications message may be measured. When a conventional data communications message is transmitted, the response may be a different response message rather than an echo back. It also will be understood that the Delay Measurement Message or the conventional message need not include a timestamp therein. Rather, the time that the message was transmitted may be recorded at the transmitting device and need not be included in the message itself.

Referring back to FIG. 3, at Block 320, the adjustable retransmission timeout is adjusted based upon at least one of the round-trip communications delays that are repeatedly measured. Preferably, the retransmission timeout is adjusted based upon the last one of the round-trip communications delays that are repeatedly measured, in order to provide a timeout that reflects a current state of communications between the devices over the network. It will be understood that although the adjustable retransmission timeout preferably is adjusted in the device 100', it may be adjusted outside the device 100'.

Still referring to FIG. 3, at Block 330, a message that is not acknowledged during the adjustable timeout that is based upon the measured round-trip delay is retransmitted. In detail, referring again to FIG. 4, a Communications Message is transmitted by the transmission section 220 of FIG. 2. If an acknowledgement message is not received by the transmitting device within the adjustable retransmission timeout that is based on at least one of the round-trip communications delays that are repeatedly measured, then the Communications Message is retransmitted from the transmitting device to the receiving device.

Accordingly, a device measures a round-trip delay by repeatedly and preferably periodically transmitting a message with a current timestamp to another device that responds by echoing the measurement signal back to the transmitting device. The transmitting device then determines the round-trip delay by subtracting the received timestamp value from the current time. This retransmission timeout value is an indicator of how long the device should wait for an acknowledgement from the other device. If a device does not receive the acknowledgement before the end of the retransmission timeout, it retransmits the original message.

Repeated round-trip delay measurements are performed because the round-trip delay over the communications network can change over time due to altered routing, traffic changes, changed transmission equipment, temperature variations and/or other reasons. Moreover, if new functions are added to a device, the response time may change. The repeated delay measurement allows the device to optimize the retransmission timeout value automatically if the total round-trip delay changes.

Figure 5:
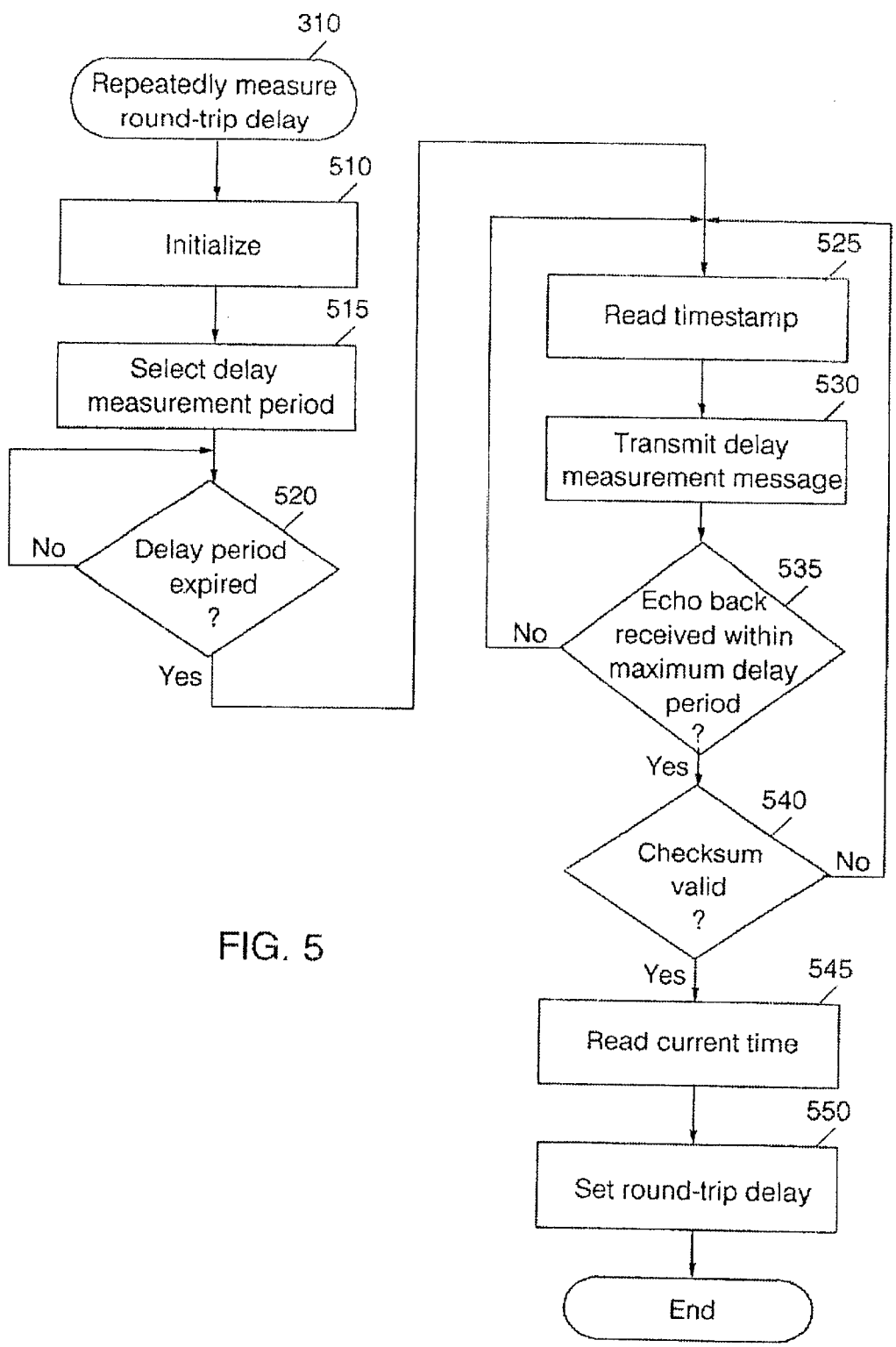
FIG. 5 is a flowchart illustrating detailed operations for repeatedly measuring a round-trip delay according to an embodiment of the present invention.

Referring now to FIG. 5, detailed operations for repeatedly measuring the round-trip delay (Block 310 of FIG. 3) now will be described. At Block 510, the round-trip communications delay, denoted herein by LinkDelay, is initialized to a maximum allowable delay, denoted herein by MaxDelay, based on the type of connection between the two devices. At Block 515, a delay measurement period, denoted herein by DelayPeriod, is selected. The delay measurement period defines the periodicity at which the round-trip communications delay between the two devices over the communications network is measured. The DelayPeriod may be selected based upon the type of connection, such as local area network, wide area network or the Internet, and can vary from seconds or less to days or more.

Continuing with the description of FIG. 5, at Block 520, operations wait until DelayPeriod expires or connection between the devices is established or reestablished. At that time, as shown at Block 525, the timestamp, denoted herein by TimeStamp, is read, for example from a free-running counter that is incremented every r milliseconds (ms). Then, at Block 530, the Delay Measurement Message is transmitted to the receiving device. The Delay Measurement Message may have the following format:

| Message Type | Data | | Checksum |
|---|---|---|---|
| DelMeas | TimeStamp | Padding | CS_DelMeas |

As shown, the Delay Measurement Message may have a DelMeas identifier that identifies the message. The Delay Measurement Message also may include the TimeStamp and a checksum. A Padding field may also be included. The length of the Padding field preferably is selected so that the delay measurement message is the longest message that is sent between the devices. In this manner, the maximum round-trip delay may be measured.

Continuing with the description of FIG. 5, at Block 535, the receiving device recognizes the Delay Measurement Message based on the message type (DelMeas) and echoes it back. A test is made as to whether the echo back is received within the maximum allowable delay period MaxDelay. If not, a new message is sent beginning at Block 525. If yes, a calculation is made as to whether the calculated checksum is equal to the received checksum at Block 540. If not, a new message is sent beginning at Block 525.

If the echo back was received within the maximum allowable delay period and the checksum is valid, then at Block 545, the current counter value, denoted by CurrentTime, is read. The round-trip delay (LinkDelay) is then set at Block 550 using the following equation:

LinkDelay=CurrentTime−TimeStamp.

The adjustable retransmission timeout may be set to this last measured round-trip communications delay. Alternatively, the adjustable time may be based on an average of a predetermined number of last round-trip delay measurements. In yet another alternative, a guard band may be added to the last measured round-trip delay to account for potential changes since the last measured delay. Other techniques for determining the adjustable retransmission timeout may be provided.

It will be understood that the size (n bits) and the time resolution (r ms) of the counter may determine the minimum and maximum measurable delays as follows:

DelayMin=r ms

DelayMax=$(2^n-1) \times r$ ms

Accordingly, if n=16 and r=1 ms, then DelayMax=$(2^{16}-1) \times 1$ ms=65.535 s. It also will be understood that if link delay is less than 0, this generally means that the counter has rolled over, so that link delay is set to $2^n$+LinkDelay.

Figure 6:
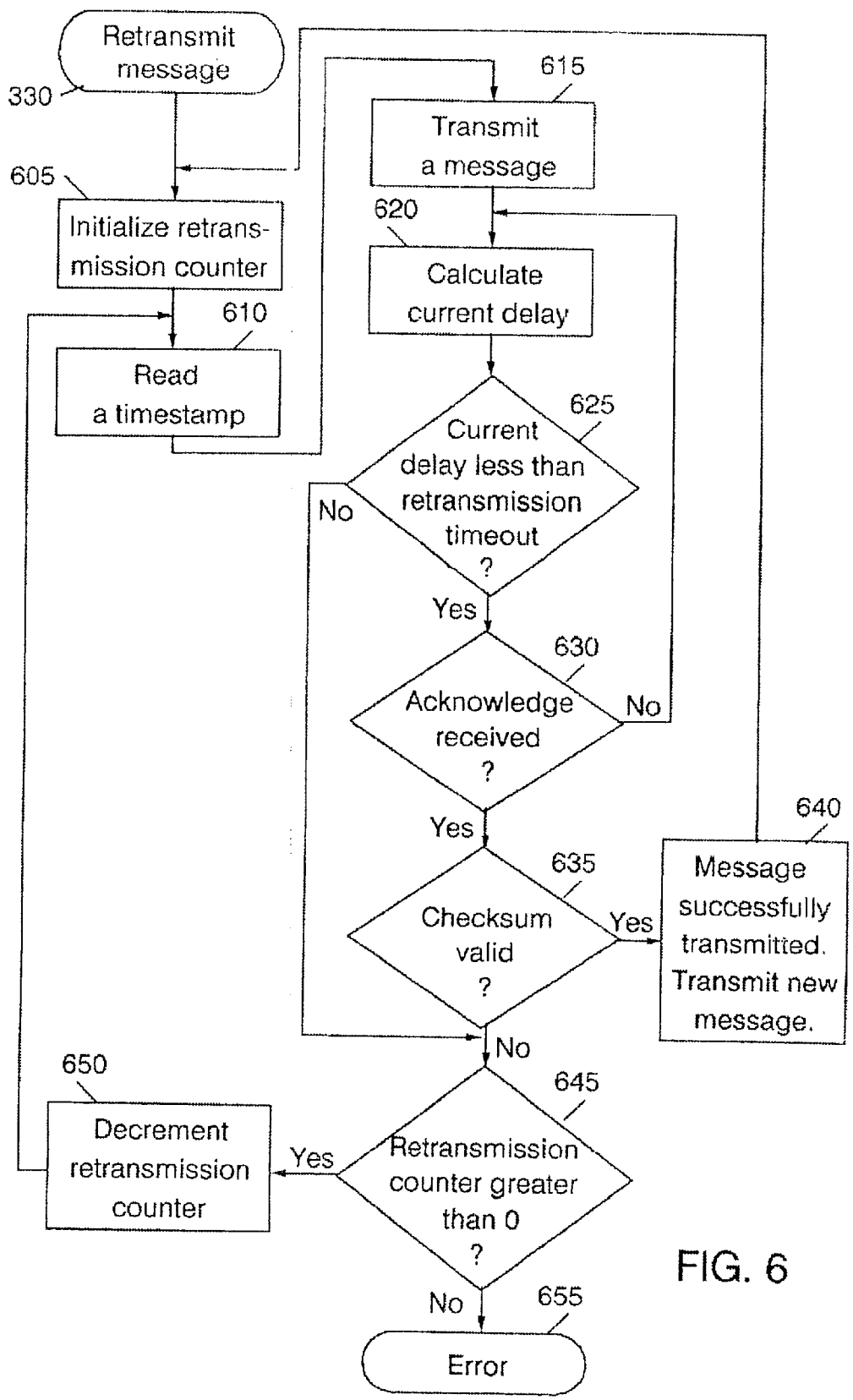
FIG. 6 is a flowchart illustrating operations for retransmitting a message according to an embodiment of the present invention.

Referring now to FIG. 6, detailed operations for retransmitting a message that is not acknowledged during an adjustable retransmission time based upon the measured round-trip delay (Block 330 of FIG. 3) now will be described. As shown in Block 605, a retransmission counter, denoted by RetrCntr, is initialized to the maximum number of allowable retransmissions denoted by MaxRetr. The value of MaxRetr may depend on the application. Then at Block 610, a timestamp denoted TimeStamp is read from the free-running counter. At Block 615, a message is transmitted to the receiving device. The message may have the following form, although other forms may be used:

| Message Type | Data | Checksum |
|---|---|---|
| Sig_X | Data_X | CS_SigX |

If the receiving device receives the message and if the calculated checksum is equal to the received checksum (CS_SigX), it sends back an acknowledge message that may have the following format:

| Signal Type | Checksum |
|---|---|
| Ack_X | CS_AckX |

Other acknowledgement messages may be used and/or a reply message may be sent.

Referring now to Block 620, a CurrentDelay is calculated by reading the current counter value, referred to as CurrentTime. The CurrentDelay then is calculated as:

CurrentDelay=CurrentTime−TimeStamp.

It also will be understood that if the value of CurrentDelay is less than 0, this generally means that the counter has rolled over and CurrentDelay is calculated by the following relationship:

CurrentDelay=$2^n$+CurrentDelay.

Then, at Block 625, a test is made as to whether the CurrentDelay is less than the retransmission timeout that was set as a result of the operations of FIG. 5. If the CurrentDelay is not less than the retransmission timeout that was set, then at Block 645, a determination is made as to whether the retransmission counter is greater than zero. If the retransmission counter is greater than zero, then the retransmission counter is decremented at Block 650 and the message is retransmitted beginning at Block 610. On the other hand, if the retransmission counter is zero at Block 645, there are no retransmission attempts left. Error handling is then performed beginning at Block 655, using conventional error handling procedures.

Returning again to Block 625, if the CurrentDelay is less than the retransmission timeout, then a test is made at Block 630 as to whether an acknowledgement has been received. If the acknowledgement has not been received, the CurrentDelay is recalculated until the acknowledgement is received or the CurrentDelay is longer than the delay period at Blocks 625 and 630. If the acknowledgment is received at Block 630 prior to expiration of the retransmission timeout, then at Block 635, a test is made as to whether the calculated checksum is equal to the received checksum CS_AckX. If the checksums are equal, the acknowledgement message was received in time and is valid. The message was successfully transmitted as indicated at Block 640 and a new message is transmitted by again performing the operations beginning at Block 605. On the other hand, if the checksum was not valid, then the operations beginning at Block 645 are performed again to determine whether the message can be retransmitted or if there are no more retransmission attempts left.

Accordingly, the retransmission timeout may be optimized based on the round-trip delay time of the communications network approximately contemporaneous with the transmission of a message. Realistic timeouts therefore may be used, that are neither too long nor too short, based on the current network performance.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of communicating between two devices that are connected by a communications network, the method comprising the steps of:

repeatedly measuring a round-trip communications delay between the two devices over the communications network;

adjusting an adjustable retransmission timeout based upon at least one of the round-trip communications delays that are repeatedly measured; and retransmitting a message that is not acknowledged by the second device during the adjustable retransmission timeout;

wherein the repeatedly measuring step comprises the following steps that are repeatedly performed:
   transmitting a first message at a transmit time;
   receiving an acknowledgement of the first message at a receive time; and
   determining a time difference between the receive time and the transmit time to thereby obtain the adjustable retransmission timeout;

wherein the first message is a delay measurement message that is used to measure delay and that does not contain communications data;

wherein the delay measurement message contains a timestamp therein that indicates the first time; and wherein the delay measurement message also contains padding therein so that the delay measurement message is at least as long as a longest communication message between the two devices.

2. A method according to claim 1 wherein the adjusting step comprises the step of adjusting an adjustable retransmission timeout based upon a last one of the round-trip communications delays that are repeatedly measured.

3. A method according to claim 1 wherein the retransmitting step comprises the steps of:

awaiting receipt of an acknowledgement of the first message during the adjustable retransmission timeout; and retransmitting the first message if the acknowledgment is not received during the adjustable retransmission timeout.

4. A system for communicating between two devices that are connected by a communications network, the system comprising:

means for repeatedly measuring a round-trip communications delay between the two devices over the communications network;

means for adjusting an adjustable retransmission timeout based upon at least one of the round-trip communications delays that are repeatedly measured; and means for retransmitting a message that is not acknowledged during the adjustable retransmission timeout;

wherein the means for repeatedly measuring comprises:
   means for transmitting a first message at a transmit time;
   means for receiving an acknowledgement of the first message at a receive time; and
   means for determining a time difference between the receive time and the transmit time to thereby obtain the adjustable retransmission timeout;

wherein the first message is a delay measurement message that is used to measure delay and that does not contain communications data;

wherein the delay measurement message contains a timestamp therein that indicates the transmit time; and wherein the delay measurement message also contains padding therein so that the delay measurement message is at least as long as a longest communication message between the two devices.

5. A system according to claim 4 wherein the means for adjusting comprises means for adjusting an adjustable retransmission timeout based upon a last one of the round-trip communications delays that are repeatedly measured.

6. A system according to claim 4 wherein the means for retransmitting comprises:

means for awaiting receipt of an acknowledgement of the first message during the adjustable retransmission timeout; and means for retransmitting the first message if the acknowledgment is not received during the adjustable retransmission timeout.

7. A computer program product for communicating between two devices that are connected by a communications network, the computer program product comprising a computer-readable storage medium having computer-readable program code means embodied in the medium, the computer-readable program code means comprising:

computer-readable program code means for repeatedly measuring a round-trip communications delay between the two devices over the communications network;

computer-readable program code means for adjusting an adjustable retransmission timeout based upon at least one of the round-trip communications delays that are repeatedly measured; and computer-readable program code means for retransmitting a message that is not acknowledged during the adjustable retransmission timeout;

wherein the computer-readable program code means for repeatedly measuring comprises:

computer-readable program code means for transmitting a first message at a transmit time;

computer-readable program code means for receiving an acknowledgement of the first message at a receive time; and computer-readable program code means for determining a time difference between the receive time and the transmit time to thereby obtain the adjustable retransmission timeout;

wherein the first message is a delay measurement message that is used to measure delay and that does not contain communications data;

wherein the delay measurement message contains a timestamp therein that indicates the transmit time; and wherein the delay measurement message also contains padding therein so that the delay measurement message is at least as long as a longest communication message between the two devices.

8. A computer program product according to claim 7 wherein the computer-readable program code means for adjusting comprises computer-readable program code means for adjusting an adjustable retransmission timeout based upon a last one of the round-trip communications delays that are repeatedly measured.

9. A computer program product according to claim 7 wherein the computer-readable program code means for retransmitting comprises:

computer-readable program code means for awaiting receipt of an acknowledgement of the first message during the adjustable retransmission timeout; and computer-readable program code means for retransmitting the first message if the acknowledgment is not received during the adjustable retransmission timeout.

10. A device that communicates with a second device over a communications network, the device comprising:

a dynamic communications delay measurement system that repeatedly measures a round-trip communications delay with the second device over the communications network;

a retransmission timeout adjuster that adjusts an adjustable retransmission timeout based upon at least one of the round-trip communications delays that are repeatedly measured; and a message retransmitter that retransmits a message that is not acknowledged by the second device during the adjustable retransmission timeout;

wherein the dynamic communications delay measurement system comprises:

a transmitter that transmits a first message at a transmit time;

a receiver that receives an acknowledgement of the first message at a receive time; and a calculator that determines a time difference between the receive time and the transmit time to thereby obtain the adjustable retransmission timeout;

wherein the first message is a delay measurement message that is used to measure delay and that does not contain communications data;

wherein the delay measurement message contains a timestamp therein that indicates the first time; and wherein the delay measurement message also contains padding therein so that the delay measurement message is at least as long as a longest communication message between the device and the second device.

11. A device according to claim 10 wherein the retransmission timeout adjuster adjusts the adjustable retransmission timeout based upon a last one of the round-trip communications delays that are repeatedly measured.

12. A device according to claim 10 wherein the message retransmitter awaits receipt of an acknowledgement of the first message during the adjustable retransmission timeout, and retransmits the first message if the acknowledgment is not received during the adjustable retransmission timeout.

* * * * *